(12) United States Patent
DeMers et al.

(10) Patent No.: US 7,742,847 B2
(45) Date of Patent: Jun. 22, 2010

(54) METHOD AND SYSTEM FOR CONTEXT SENSITIVE AIRCRAFT NAVIGATION

(75) Inventors: Robert E. DeMers, Elk River, MN (US); David W. Meyers, Brooklyn Park, MN (US); Brian R. Buchanan, Overland Park, KS (US); David T. Spoor, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 806 days.

(21) Appl. No.: 11/553,341

(22) Filed: Oct. 26, 2006

(65) Prior Publication Data

US 2008/0103645 A1 May 1, 2008

(51) Int. Cl.
*G01C 23/00* (2006.01)
(52) U.S. Cl. .......................... 701/14; 701/3
(58) Field of Classification Search .............. 701/3, 701/14–16, 120–122; 340/945, 951, 959, 340/963–964; 244/75.1, 183; 342/33–35
See application file for complete search history.

(56) References Cited

U.S. PATENT DOCUMENTS

| | | | | |
|---|---|---|---|---|
| 4,536,843 | A | * | 8/1985 | Lambregts ............... 701/3 |
| 5,079,711 | A | * | 1/1992 | Lambregts et al. .......... 701/3 |
| 6,163,744 | A | | 12/2000 | Onken et al. |
| 6,311,107 | B1 | | 10/2001 | Curto et al. |
| 6,542,796 | B1 | * | 4/2003 | Gibbs et al. ................ 701/3 |
| 2005/0107951 | A1 | | 5/2005 | Brulle-Drews et al. |

FOREIGN PATENT DOCUMENTS

| | | |
|---|---|---|
| FR | 2872316 | 12/2005 |
| WO | 0016230 | 3/2000 |
| WO | 0070581 | 11/2000 |
| WO | 0125727 | 4/2001 |
| WO | 0225213 | 3/2002 |

OTHER PUBLICATIONS

European Patent Office, "European Search Report", Feb. 27, 2008, Published in: EP.
"IFR Procedures", "URL: http://www.cheltonflightsystems.com/PDFs/50CPilotsGuide/50CIFRProcedures.pdf", 2005, pp. 7-1-7-40, Publisher: Chelton Flight Systems.
European Patent Office, "European Search Report", May 23, 2008, Published in: EP.
Krozel et al., "The Future National Airspace System: Design Requirements Imposed by Weather Constraints", "AIAA Guidance, Navigation, and Control Conference", Aug. 2003, pp. 1-14, Publisher: AIAA, Published in: Austin, TX, USA.

* cited by examiner

*Primary Examiner*—Yonel Beaulieu
(74) *Attorney, Agent, or Firm*—Fogg & Powers LLC

(57) ABSTRACT

A method and system for context sensitive navigation of an aircraft is provided. The method comprises obtaining data for use at takeoff, enroute, or at a destination, and interpreting the data to infer conditions during takeoff, enroute, or at the destination. One or more viable flight plans are determined based on the conditions during takeoff, enroute, or at the destination. The one or more viable flight plans are then presented to a pilot for optional selection. When there is more than one viable flight plan, a prioritized selectable list of flight plans is presented to the pilot.

20 Claims, 4 Drawing Sheets

METHOD AND SYSTEM FOR CONTEXT SENSITIVE AIRCRAFT NAVIGATION

BACKGROUND

Prior to landing an aircraft at an airport, a pilot needs to know airport environmental conditions in order to make any necessary adjustments to a flight plan. The final approach of the aircraft to the airport is the highest workload time of the entire flight for the pilot. Changes that are made to the flight plan at this time increase head-down time and lower pilot situation awareness.

Pilots typically have to radio forward to the airport to get an audio representation of the airport environmental conditions such as wind conditions. While more advanced aircraft control systems have been developed for use in certain aircraft, environmental data is still in many cases not easily accessible to the pilot during flight or excessive pilot interaction is required to retrieve the data during high workload phases of flight. Currently, pilots have to use the environmental data they do receive to make their own determination of which runway approach is optimal for landing the aircraft. While some standard aircraft control systems provide surface wind indicators to pilots, the pilot is still required to make further decisions based on the surface wind information.

One system that has been developed for use in aircraft navigation is known as AWIN (Aviation Weather Information), which is an on-board avionics application that provides real-time graphic aviation weather information to pilots. The AWIN system includes software, data, and data link applications, which provide user-friendly, color weather graphics such as composite-radar mosaic, lightning-strike data, wind data, satellite images, and forecasts. The AWIN system further integrates existing textual AIRMET (Airman's meteorological information), terminal area forecasts, aircraft present position, and flight plan information into a single-source pilot workstation.

Some aircraft control systems use METAR (Meteorological Terminal Aviation Routine Weather Report), which is a format for reporting weather information from airports. Such information can include temperature, wind conditions, cloud conditions, visibility, etc. The METAR may also provide information on convective activity, precipitation type, precipitation amounts, lightning, and other information that would be of interest to pilots.

In a typical flight scenario, the pilot collects disparate, unfused data from multiple sources as he or she has time. The pilot then fuses and interprets the data/situation. The pilot manually enters plan changes into a navigation system, which includes many steps, and then flies according to the plan. The unfused data can include an aircraft operation performance model comprising take off and landing distance, weight/balance, and aircraft crosswind performance envelope; METAR-current winds and weather; terminal area forecast (TAF); automatic terminal information service (ATIS) radio current winds; runway-in-use; flight service station (FSS) radio enroute; ground weather terminals; visual conditions; flight experience; domain knowledge; airport environment such as runway conditions and density altitude; approach path; charts/maps/plates; XM satellite weather graphics; flight information system, ground-based VDL (VHF data link) FIS (flight information services) data link weather; VDL radio graphics; and global positioning system (GPS) moving map graphics.

Conventional navigation systems provide various displays that a pilot has to page through one at a time for situation awareness. Such displays typically include graphical information related to the above data such as airport environment, airport information, weather mosaic, lighting strikes, area weather conditions, current airport weather, map overlays, and terrain overlays. Such displays need to be viewed and analyzed during the high workload of the critical terminal phase of the flight. A pilot will make certain decisions with respect to a landing approach based on all of the information at hand. In general, it is not quick or easy to make entries into aircraft navigation systems. Thus, reducing the time it takes to modify flight plans would improve flight safety and efficiency.

SUMMARY

The present invention relates to a method and system for context sensitive navigation of an aircraft. The method comprises obtaining data for use at takeoff, enroute, or at a destination, and interpreting the data to infer conditions during takeoff, enroute, or at the destination. One or more viable flight plans are determined based on the conditions during takeoff, enroute, or at the destination. The one or more viable flight plans are then presented to a pilot for optional selection. When there is more than one viable flight plan, a prioritized selectable list of flight plans is presented to the pilot.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention relates to a method and system for context sensitive aircraft navigation, which uses near real-time weather and other airspace data to reduce the amount of time it takes to enter flight plan changes. The present method and system takes what it knows about the flight plan and data link data and presents the most likely flight plan options to a pilot in an easy to select manner. For example, if the system knows the direction of winds at the destination airport, the system can predict which approaches will be used that day and presents choices of approaches in an ordered and easily selectable format. This will not prevent the pilot from making other choices, but it will make the most likely choice the easiest to select.

In general, the context sensitive navigation method and system provide for obtaining of relevant data for use at takeoff, enroute, or at a destination, and interpretation of the data to infer conditions during takeoff, enroute, or at the destination. One or more viable flight plans are determined based on the conditions, and the flight plans are displayed in a prioritized selectable list to give the pilot suggestions, so that the pilot can more easily interpret the data. This orders the data processing for the pilot so that the available information is more user friendly, thereby reducing the pilot's head-down time.

The context sensitive navigation system pulls together pieces of information that are generally available but disparate, and puts the information in a display format that can be easily used by the pilot to make proper decisions. For example, the context sensitive navigation system can use runway information and weather information to determine one or more preferred landing approaches for an aircraft. Given a choice of runways for landing, a recommendation can be made to the pilot of the best runway to use based on the known wind conditions and runway length. The pilot can make the landing approach decision based on what is recommended, so that the pilot is aided in figuring out which approach would be best. The context sensitive navigation system reduces the amount of work required to determine an optimal approach for landing, alleviating some of the high workload the pilot has during a landing approach.

Figure 1:
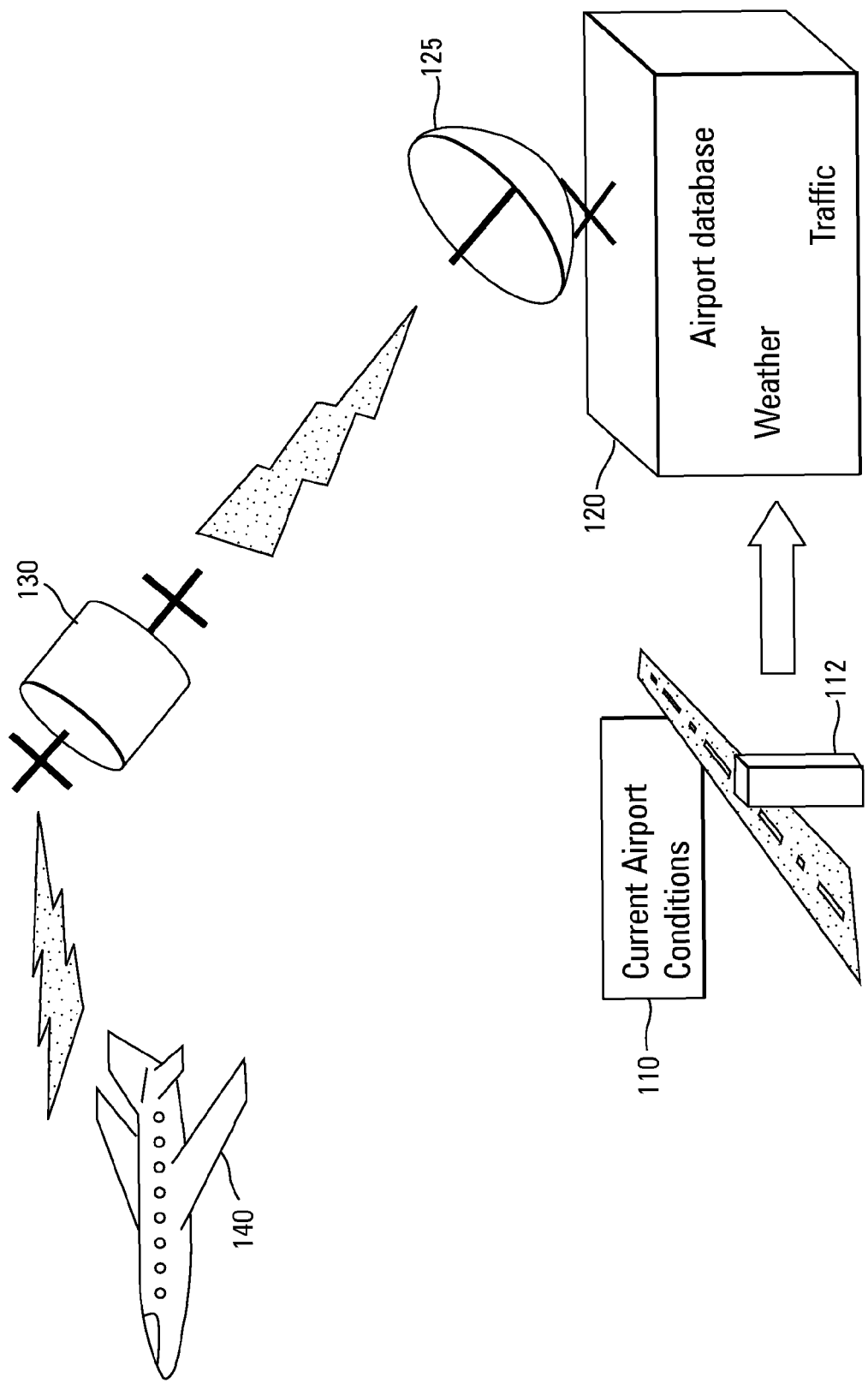
FIG. 1 is a schematic diagram depicting a method for implementing context sensitive navigation according to the present invention.

FIG. 1 is a schematic diagram depicting a method for implementing context sensitive navigation according to the present invention. Current airport conditions 110 are transmitted from a weather sensing device 112 to an airport database 120. The airport database contains current information relative to weather, traffic patterns, airport configuration, and runway conditions. The relevant data is transmitted from a satellite dish 125 to a receiver of a satellite 130. The data is then transmitted from satellite 130 to a receiver on an aircraft 140 that has a context sensitive navigation system onboard. For example, XM radio satellite data is typically broadcast to an aircraft at 5 minute intervals.

Figure 2:
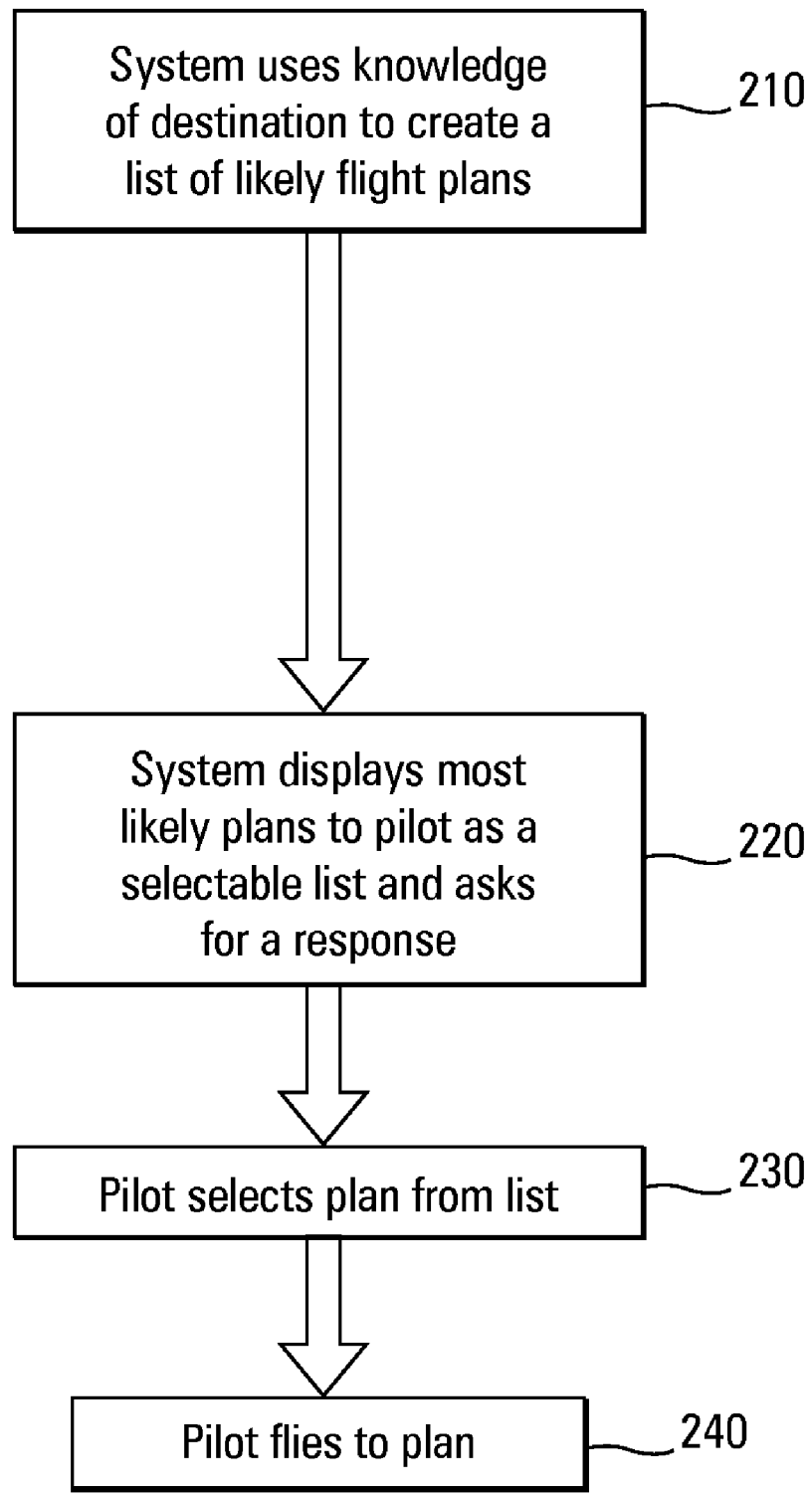
FIG. 2 is a flow diagram showing the general concepts for a method and system of context sensitive navigation according to the present invention.

In general, as shown in FIG. 2, the context sensitive navigation system uses knowledge of the destination to create a list of likely flight plans (block 210). For example, wind conditions, notices to airmen (NOTAMs), temporary flight restrictions (TFRs), and runway environment conditions can be used to determine the angle of approach of an aircraft. The system then displays or presents the most likely flight plans to the pilot as a selectable list and asks for a response (block 220). For example, the flight plans can be prioritized and presented as suggestions to the pilot in a selectable list of potential flight plans. The pilot then selects a flight plan from the list (block 230), and flies according to the plan (block 240).

The present method and system make use of near real-time data sent directly to the aircraft to suggest changes to the flight plan that can be selected by the pilot. The selectable flight plans can be displayed to the pilot in an easily understood format on a display screen showing attitude, direction, etc. This reduces the terminal area workload for a pilot.

Figure 3:
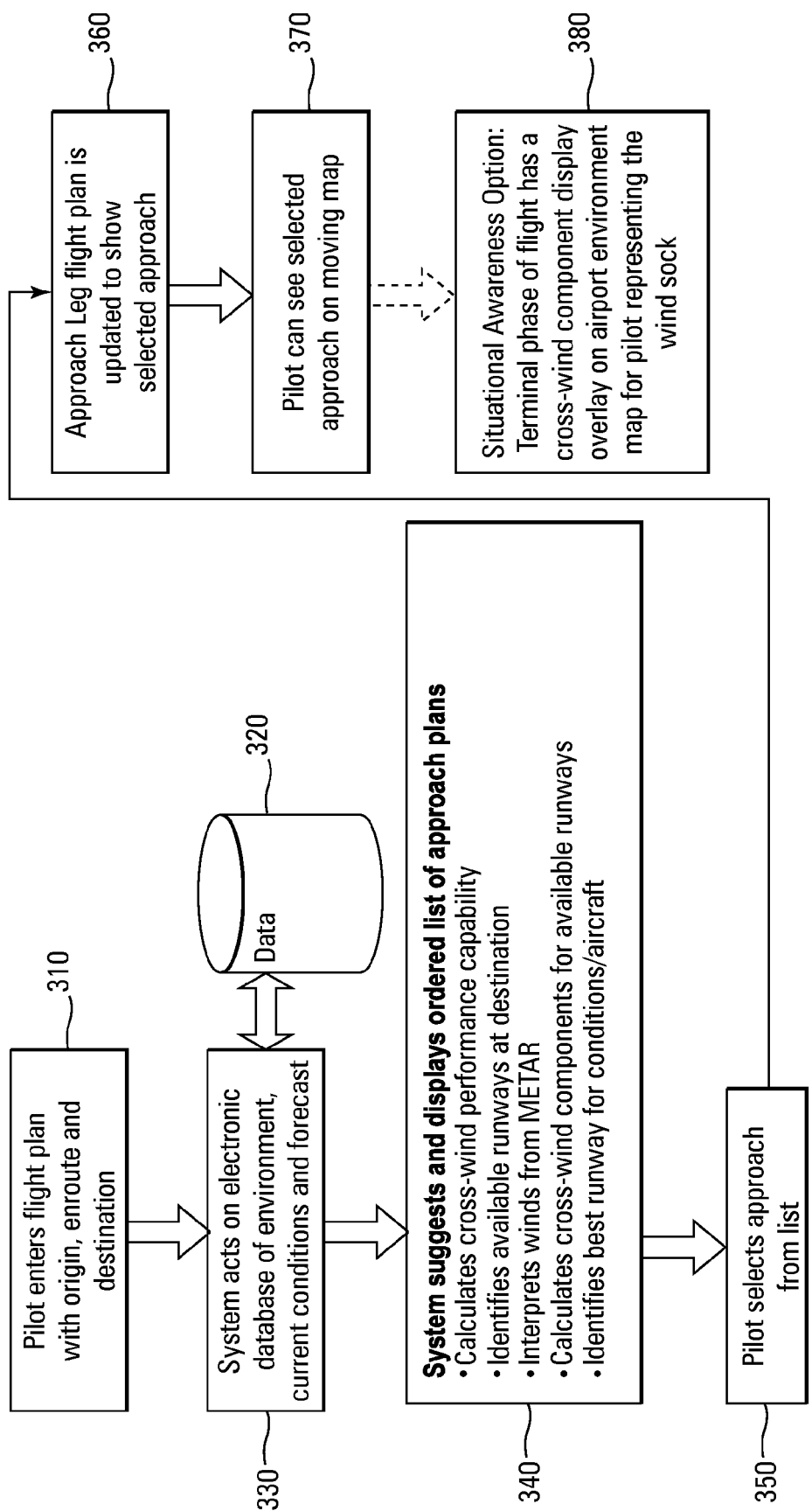
FIG. 3 is a flow diagrams further details of the context sensitive navigation method and system according to the present invention.

Further details of the context sensitive navigation method and system are depicted in FIG. 3. Initially, the pilot enters a flight plan with origin, enroute, and destination information into a computer navigation system (block 310). The navigation system interacts with an electronic database (320) containing runway environment, current weather conditions, and weather forecast information (block 330). The navigation system suggests and displays an ordered list of approach plans (block 340) when used for a landing. Such a list can be produced from various input data, such as calculations of crosswind performance capability; identification of available runways at the destination; interpretation of winds from METAR; calculation of crosswind components for available runways; and identification of the best runway for conditions/aircraft. The pilot then selects an approach plan from the ordered list (block 350). The approach leg of the flight plan is updated to show the selected approach (block 360). The pilot is able to see the flight legs for the selected approach, which is displayed on a moving map (block 370) such as a GPS moving map In an optional embodiment, a situational awareness function is added (block 380), in which the terminal phase of the flight uses a crosswind component overlay, representing a wind sock including wind direction and magnitude, displayed on, and over the top of, an airport environment map. This further aids the pilot in orienting the aircraft to the direction of the wind and the layout of the runways at the airport.

In another optional embodiment, enroute flight plan algorithms can utilize satellite weather information and winds aloft forecast data at different altitudes to suggest a flight plan that would enable fuel and/or time savings. In addition, airport environment and runway information stored in the aircraft's on-board database, and other notices, can be used to provide suggestions to enroute flight plan options. Pilots can use this information for situational awareness, which leads eventually to a favorable landing approach course. Simple rules based upon wind direction can suggest which runway is being used and which approach to take. More complex rules can be used to suggest changes in the flight plan based upon winds aloft, direction of travel and intensity of convection cells, TFRs, or SUA (special use airspace) restrictions. Given the weather conditions across the satellite weather link (e.g., plugged into an AWIN box), algorithms can be employed that produce decision aids for the pilot.

The context sensitive navigation system can make decisions about the flight plan with heuristics based upon weather and airspace data obtained from satellite radio or other broadcast channels. The system can use heuristics so that as types of an aircraft land multiple times on the same runway, the system can learn from past experience.

Figure 4:
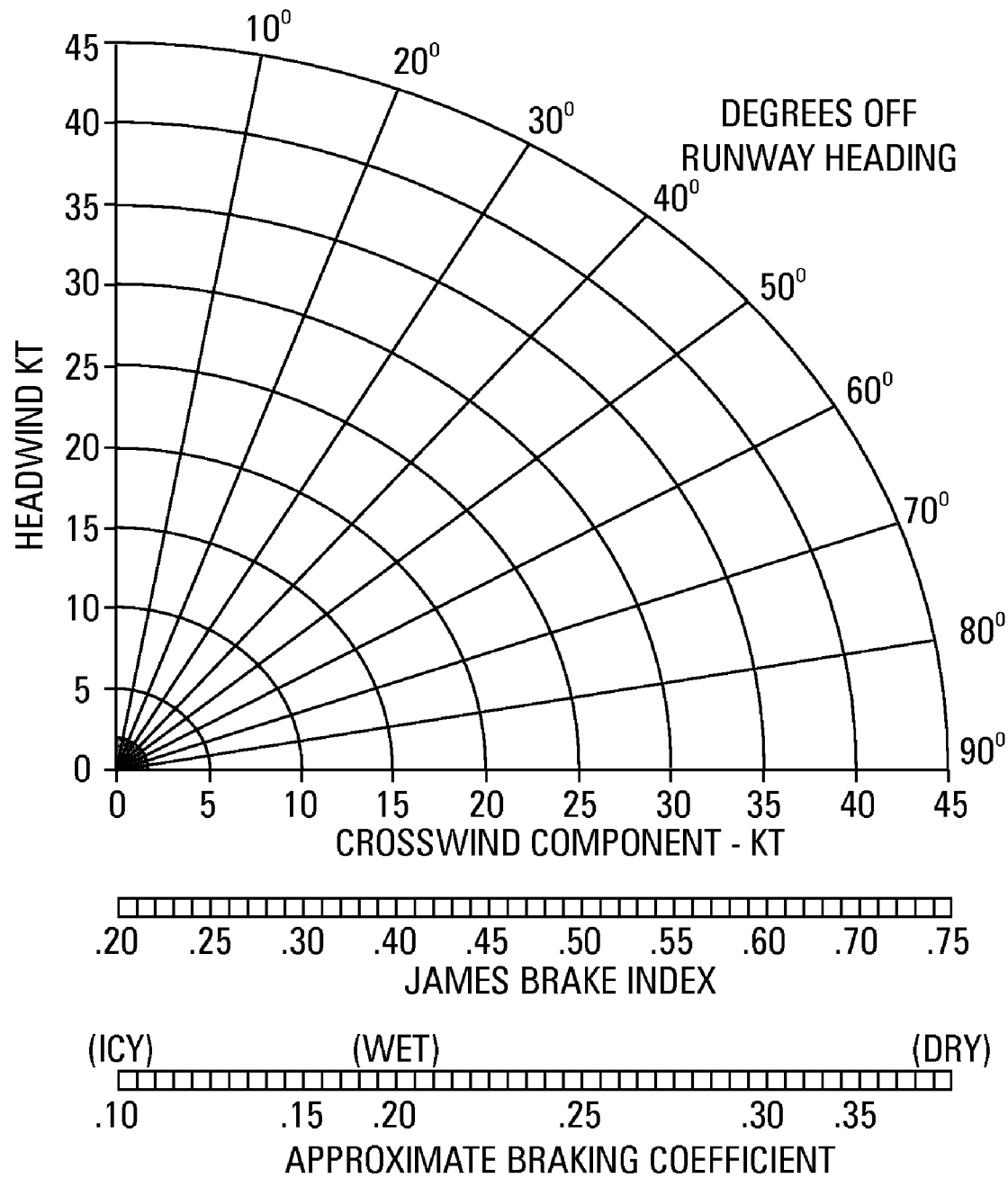
FIG. 4 is a chart that can be used to provide data for determining an algorithm for the crosswind component of approach runway vs. wind direction.

FIG. 4 is a chart that can be used to provide data for determining an algorithm for the crosswind component of approach runway vs. wind direction. Crosswind limits are based on the James brake index or the braking coefficient for headwind conditions. Pilots currently utilize crosswind component charts to determine the demonstrated landing capability of their specific aircraft and whether the aircraft has the capability to land with the current wind conditions and runway configuration. Such charts can easily be represented as a headwind and a crosswind component vector representation including direction and magnitude of the wind components relative to the runway. The wind component algorithm would then place maximum demonstrated landing crosswind performance values with respect to the available runways.

While the present method and system are particularly useful in a terminal approach by an aircraft, it should be understood that the method and system can also be used to provide takeoff and enroute information to a pilot. Thus, the present method and system are equally viable for enhanced context sensitive aiding in all phases of flight.

The present method and system can be implemented by utilizing computer hardware and/or software, which provide a means for interpreting data to infer conditions during takeoff, enroute, or at a destination, and a means for determining one or more viable flight plans based on the conditions during takeoff, enroute, or at the destination.

A means for obtaining data for use at takeoff, enroute, or at the destination can include a radio receiver in an aircraft, which is in communication with a satellite such as a weather satellite or XM radio satellite, or a ground-based radio network. A means for presenting the one or more flight plans to a pilot for optional selection can include a display screen, a user interface, or a synthetic speech output device. When there is more than one viable flight plan, a prioritized selectable list of flight plans is presented to the pilot. The selectable list of flight plans can be prioritized such that the optimal flight plan is presented first on the list as the top choice.

Instructions for carrying out the various process tasks, calculations, and generation of signals and other data used in the operation of the method and system of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method and system of the invention can be implemented in computer readable instructions, such as program modules or applications, which are executed by a data processor. Generally, program modules or applications include routines, programs, objects, data components, data structures, algorithms, etc. that perform particular tasks or implement particular abstract data types. These represent examples of program code means for executing steps of the method disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for context sensitive navigation of an aircraft, the method comprising:
    obtaining data for use at takeoff, enroute, or at a destination;
    interpreting the data to infer conditions during takeoff, enroute, or at the destination;
    determining one or more viable flight plans based on the conditions during takeoff, enroute, or at the destination; and
    presenting the one or more viable flight plans to a pilot for optional selection, wherein when there is more than one viable flight plan, a prioritized selectable list of flight plans is presented to the pilot.

2. The method of claim 1, wherein the selectable list of flight plans is prioritized such that an optimal flight plan is presented first on the list.

3. The method of claim 1, further comprising:
    selecting a flight plan from the list; and
    flying the aircraft according to the selected flight plan.

4. The method of claim 1, wherein the data comprises one or more of runway environment information, current weather conditions, or weather forecast information.

5. The method of claim 1, wherein the data is obtained from a data link to a weather satellite, an XM radio satellite, or a ground-based radio network.

6. The method of claim 1, wherein the one or more viable flight plans are determined by:
    calculating crosswind performance capability;
    calculating crosswind components for available runways; and
    interpreting wind conditions.

7. The method of claim 6, wherein the one or more viable flight plans are determined by:
    identifying available runways at the destination; and
    identifying an optimal runway at the destination based on the conditions.

8. method of claim 3, wherein the selected flight plan comprises an approach leg.

9. The method of claim 8, further comprising displaying the approach leg on a moving map.

10. The method of claim 8, further comprising displaying a crosswind component overlay on an airport environment map.

11. The method of claim 10, wherein the crosswind component overlay represents a wind sock.

12. A system for context sensitive navigation of an aircraft, the system comprising:
    a radio receiver for obtaining data for use at takeoff, enroute, or at a destination;
    a computer having program instructions operable to:
        interpret the data to infer conditions during takeoff, enroute, or at the destination; and
        determine one or more viable flight plans based on the conditions during takeoff, enroute, or at the destination; and
    a device for presenting the one or more viable flight plans to a pilot for optional selection, wherein when there is more than one viable flight plan, a prioritized selectable list of flight plans is presented to the pilot.

13. The system of claim 12, wherein the radio receiver in communication operably communicates with a weather satellite, an XM radio satellite, or a ground-based radio network.

14. The system of claim 12, wherein the device for presenting comprises a display screen, a user interface, or a synthetic speech output device.

15. The system of claim 12, wherein the selectable list of flight plans is prioritized such that an optimal flight plan is presented first on the list.

16. A computer program product, comprising:
    a computer readable medium having instructions operable to be executed to implement a method for context sensitive navigation of an aircraft, the method comprising:

obtaining data for use at takeoff, enroute, or at a destination;

interpreting the data to infer conditions during takeoff, enroute, or at the destination;

determining one or more viable flight plans based on the conditions during takeoff, enroute, or at the destination; and presenting the one or more viable flight plans to a pilot for optional selection, wherein when there is more than one viable flight plan, a prioritized selectable list of flight plans is presented to the pilot.

17. The computer program product of claim 16, wherein the selectable list of flight plans is prioritized such that an optimal flight plan is presented first on the list.

18. The computer program product of claim 16, wherein the one or more viable flight plans are determined by:

calculating crosswind performance capability;

calculating crosswind components for available runways; and interpreting wind conditions.

19. The computer program product of claim 18, wherein the one or more viable flight plans are determined by:

identifying available runways at the destination; and identifying an optimal runway at the destination based on the conditions.

20. The computer program product of claim 16, wherein the method farther comprises:

displaying an approach leg on a moving map; and displaying a crosswind component overlay on an airport environment map.

* * * * *

UNITED STATES PATENT AND TRADEMARK OFFICE
CERTIFICATE OF CORRECTION

PATENT NO. : 7,742,847 B2  Page 1 of 1
APPLICATION NO. : 11/553341
DATED : June 22, 2010
INVENTOR(S) : Robert E. DeMers et al.

It is certified that error appears in the above-identified patent and that said Letters Patent is hereby corrected as shown below:

Column 6, line 31, insert --The-- in front of the word method;
Column 8, line 11, "farther" should be changed to --further--.

Signed and Sealed this

Twelfth Day of October, 2010

David J. Kappos
*Director of the United States Patent and Trademark Office*